Jan. 5, 1943.  M. J. JOHNSON  2,307,134
MOTOR CONTROL
Original Filed April 6, 1940
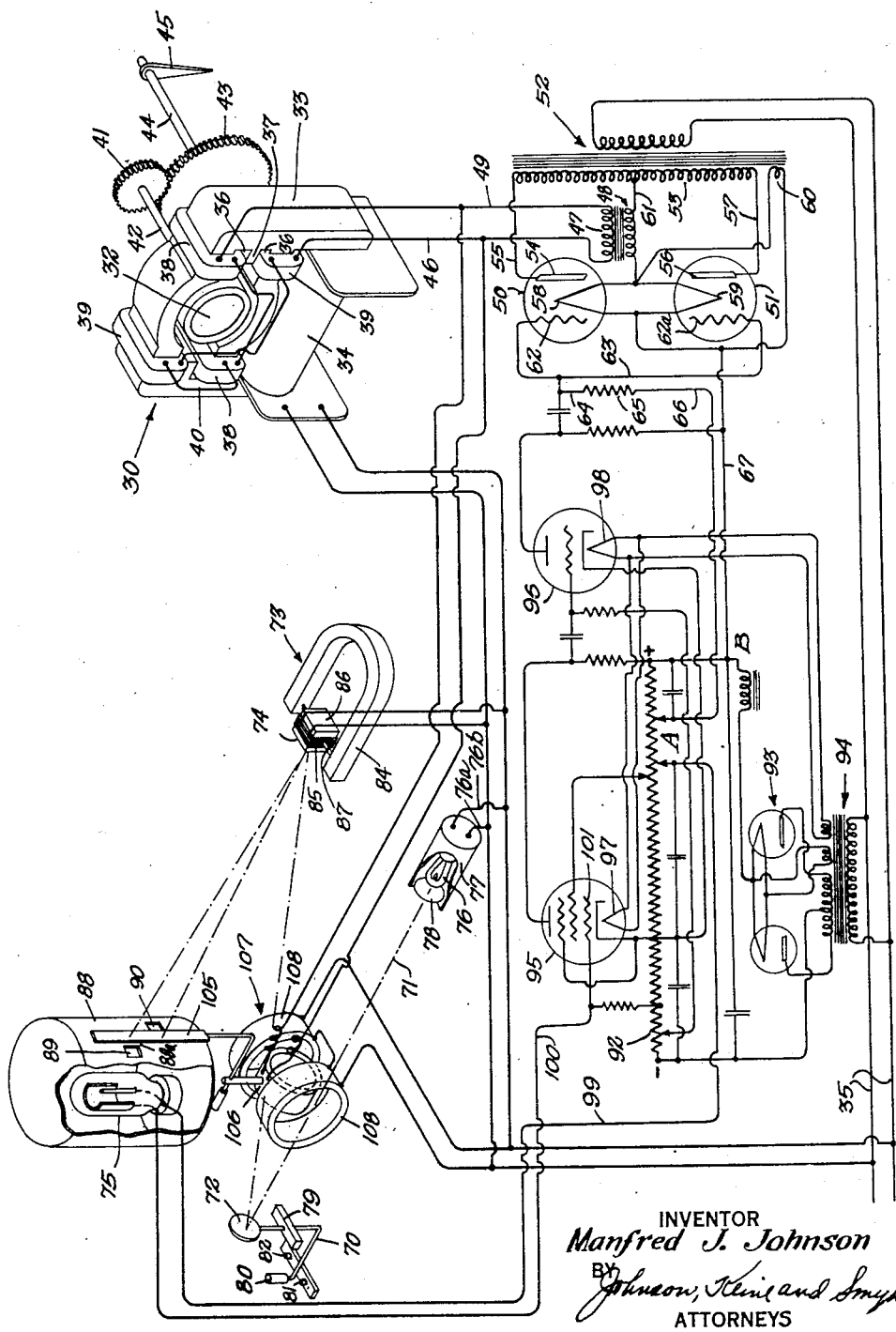
INVENTOR
Manfred J. Johnson
BY
Johnson, Klein and Smyth
ATTORNEYS Patented Jan. 5, 1943

2,307,134

UNITED STATES PATENT OFFICE 2,307,134

MOTOR CONTROL

Manfred J. Johnson, Naugatuck, Conn.

Original application April 6, 1940, Serial No. 328,364. Divided and this application April 6, 1940, Serial No. 328,266

13 Claims. (Cl. 172—239)

The present invention relates to control and/or indicating systems, and, more particularly, to control and/or indicating systems compensating for and/or indicating a change in a condition.

In many devices, it is necessary, during normal operation, to maintain a desired condition. In order to do this, it is essential to have a control and/or indicating system which, when actuated, will compensate for and/or indicate variations from a normal condition.

In order to be acceptable and successful, such systems must be flexible, efficient and quick acting so as to be sensitive to the variety of changes in a condition which are to be corrected and/or indicated to maintain the normal condition.

Another requirement of control systems of the type described is that they must be accurate in operation so that in correcting for a changing condition it will not overrun or move past the position in which correction occurs and thus set up a period of hunting during which the device will operate first to one side and then to the other of the balanced condition until the normal condition is gradually reached.

The present invention is an improvement over the motor control described and illustrated in my copending application Serial No. 188,042, and is a division of my application Serial No. 328,364, filed April 6, 1940. The control disclosed in said copending application includes a reversible motor having a continuously energized A. C. field and wire wound shading coils which are connected to thermionic devices so that the plates of the thermionic devices are energized by the shading coils. The grids of the thermionic devices are controlled in accordance with the deflection of a deflectable member to render the thermionic devices operative to load one or the other of the pairs of shading coils to cause the desired rotation in the proper direction.

The disadvantage of such a device resides in the fact that the transformer action of the motor which generates a voltage in the shading coils to be impressed on the plates is very inefficient, and, further, when controlled in the manner disclosed in said application has a limited power which, while suitable for some purposes, may not be suitable for work requiring a durable, heavy-duty operator.

In my copending application, I depend on the braking action of the main field to quickly bring the motor to stop. While this may be satisfactory for the most part, since the power of the motor is relatively small, there may be some instances when the inertia of the rotor will cause the motor to overrun and move the slide wire so as to unbalance the circuit in the opposite sense and set up a period of hunting.

The above difficulties of control have been overcome by providing a novel motor and control therefor which can be accurately regulated and inserting in the control system a means for anticipating approach to the normal condition so that the motor will be brought to rest upon the attainment of normal condition quickly, but without overrunning or hunting so that the highest degree of accuracy is obtained.

According to the present invention, I utilize a reversible A. C. motor having a pole piece providing a closed magnetic circuit around the rotor. The pole piece is energized from a continuously energized A. C. field coil and has mounted thereon, in slots formed in the face thereof, wound coils located diagonally opposite each other and connected together to form a north and south pole mechanically displaced from the main field. A second pair of coils are disposed in other diagonal slots and are connected to produce another north and south pole mechanically displaced from the main field. The two sets of wound coils are connected together in series in such a manner that they oppose one another with the result that the induced voltages in the circuit balance out, and a measurement taken across the coils would indicate zero inductance in the circuit. In other words, the measurement would show a circuit having a pure resistance therein.

With the circuit thus arranged, small currents will be effective to energize the fields. These controlling currents are derived from a source of energy independent of the motor and are controlled by thermionic devices which are rendered operative in accordance with the change in magnitude of the condition to cause the motor to rotate in one direction or the other.

The thermionic devices are controlled through photoelectric means so as to impress on the control circuit suitable currents which are electrically out of phase with the energization of the main field, that is, either lead or lag the main field, so as to produce a rotating field in the motor and cause the rotor to be driven in one direction or the other.

The preferred control means includes a single photocell and a single light source producing a single light beam which is directed to a deflectable member having a mirror thereon for reflecting the light beam to an oscillating unit which has a reflecting surface, and, upon being oscillated, will cause the light beam to be quickly vibrated.

The photocell is enclosed in a shield having spaced perforations. The oscillating unit is connected to the same source of supply as the motor so that it oscillates in step therewith and is so disposed that it causes one or the other of the apertures to be illuminated upon deflection of the deflectable member to impress a suitable charge on the grids of the thermionic devices in a predetermined phase relationship with the energization of the motor, through the medium of controlled electron devices and thus cause the controlling field coils to be energized and set up their own field mechanically and electrically out of phase with the main field to thus produce the rotating field for driving the rotor.

A feature of the invention resides in a novel barrier construction which controls the illumination of the apertures in the shield upon an unbalanced condition being detected. This barrier is mounted on a movable member which is electrically connected to the controlling field so as to be operated in accordance with the controlling current in the circuit and in effect anticipates a balanced condition to gradually bring the motor to a stop when a balanced condition exists.

Inasmuch as the motor construction of the present invention is operable upon slight currents being impressed on the control field, very minute adjustments can be made, for, as the light beam moves into position to illuminate one of the apertures, it will cause a voltage to be impressed on the grid of the thermionic devices which will permit a limited flow of current in the circuit. This will, of course, cause the motor to creep in a direction to correct for the slight change.

For such conditions, the current in the field circuit will probably be insufficient to effect the movable barrier to cause it to pass over the aperture which is illuminated. If the change is within one part in 400 from its normal established condition, the motor will be operated directly in accordance with the amount of change.

For changes of condition of a magnitude greater than this, the aperture will be illuminated sufficiently to operate the motor at full speed. Such a change will also cause the movable barrier to move over the aperture to cover a portion thereof. This movement, however, is limited so as to not affect the operation of the motor, and, of itself, cause the motor to slow down.

As the balanced or normal condition is approached, the deflectable member will be moved to cause the light beam to move toward the barrier. As the light beam thus moves, it will cause the movable barrier to become effective to decrease the speed of the motor and as the motor decreases in speed it will return to its normal position in which it does not intercept the light illuminating the cell. However, it will be apparent that this arrangement in effect moves the movable barrier into the aperture to anticipate the balanced condition and slows the motor down very quickly as the normal condition is approached so that the inertia of the movable parts will not carry the motor beyond the balanced position.

Other features and advantages will be apparent from the specification and claims when taken in connection with the drawing, in which:

The single figure shows a diagrammatical view of the controlling means.

As is shown in the drawing, the driving means of the present invention comprises a reversible A. C. motor 30 having a rotor 32 disposed within a pole piece 33 which forms a closed magnetic circuit therearound. The pole piece is energized by a continuously energized A. C. field 34 connected across the main supply line 35.

A pole piece is provided at each side of the rotor with two slots 36 opening toward the rotor so as to leave a projecting portion or tooth 37 therebetween at each side of the rotor in substantial alignment.

According to the present invention, a pair of wound coils 38 are disposed with one leg of each coil in diagonally opposite slots 36, and the coils are connected together in series so as to produce a north and south pole mechanically displaced from the main field.

A similar pair of coils 39 are mounted on the pole pieces in the other pair of diagonally opposite slots 36, with one leg thereof disposed in the slots and these coils are also connected in series so as to produce a north and south pole mechanically displaced from the main field.

The two sets of coils are then connected in series by a wire 40 in such a manner that they are in opposition to ane another so that the resultant induced voltage in the circuit will be zero. In other words, if a measurement was taken across the circuit, it would indicate a pure resistance in the circuit.

When current is passed through the series-connected coils in predetermined time out-of-phase relation with the energization of the A. C. field, it will set up a controlling field which will coact with the main field and produce a rotating field having its direction of rotation determined by the displacement of the field set up by the coils, either leading or lagging with respect to the main field produced by the A. C. coil 34 and the rotor will turn in either direction. The rotor will rotate a gear 41 secured to the rotor shaft 42 to drive a gear 43 which causes the indicator shaft 44 to move the indicator 45 carried thereby or to actuate valve mechanisms or other control devices which might be connected for operation thereby.

In order to control the energization of the coils 38, 39 producing the controlling field, the present invention connects one end of the series-connected coils 39 through a wire 46 to one end of the secondary coil 47 of a transformer 48. The other end of the secondary coil is connected through the wire 49 to the coil 38. The transformer couples the coils 38, 39 to a pair of thermionic devices 50, 51 to be energized thereby.

In the illustrated form of the invention, these thermionic devices are shown to be three electrode tubes of the type comprising a filament, a plate and a grid. It is to be understood, however, that other thermionic tubes, which can readily control a circuit, may be used.

A power supply transformer 52 has its primary coil connected across the power line 35. The secondary 53 of the transformer has one end connected to the plate 54 of the thermionic device 50 through a wire 55 and the other end of the secondary is connected to plate 56 of the thermionic device 51 through a wire 57. The filaments 58 and 59 of the thermionic devices are connected across another secondary coil 60 of the transformer 52 to be energized thereby. It will be noted that the power line which supplies the A. C. current to the transformer also energizes the motor field 34.

The midpoint of secondary coil 53 is connected to the filament circuit by a wire 61 and the primary of the coupling transformer 48 is connected in this wire so as to control the energization of the field coils in accordance with the operation of the devices 50, 51.

When the thermionic devices 50, 51 are so connected, the plates 54 and 56 will have impressed thereon charges of opposite polarity, except at the instant when the alternating wave goes through zero, and the plates will also be of opposite polarity to the filament.

The grids 62, 62a of the thermionic devices 50 and 51 are connected together by a wire 63, and this wire is connected through a wire 64 and a suitable grid resistor 65 and a wire 66 to the point A representing the negative potential on a suitable source of direct current energy supply to be hereinafter described. The positive side of the source of D. C. energy, as designated by point B, is connected by a wire 67 to the filaments of the thermionic devices, and, therefore, the grids of said devices have impressed on them a negative charge with respect to the filaments, the magnitude of which charge is sufficient to normally render the devices inoperative to pass current to the controlling field.

It may be seen that by impressing, at properly timed intervals, a suitable less negative charge on the grids of the thermionic devices 50 and 51 the device, which has its plate positive during said intervals, will be made to function and will, through the coupling transformer means 48, supply a proper current to the coils which, as will be explained, will be electrically out of phase with the energization of coil 34 to produce a rotating field and cause rotation of the motor in a proper direction.

The means herein illustrated for controlling the rotation of the motor directionally includes an actuator or deflectable member 70 which is operated through suitable instrumentalities to move to one side or another of a zero position in response to changes in a condition. This means also employs solely one photosensitive cell which, when energized as will be explained, will impress charges on the grids of these devices in accordance with movement of the deflectable member from its zero position in such a manner that deflection of the movable member in one direction will cause to function one of the thermionic devices and deflection of the deflectable member in the other direction to cause to function the other of the thermionic devices. Movement of the deflectable member may be obtained by manual operation or automatically through various types of operators which connect the deflectable member to pressure gauges, flow meters, or other controlling instrumentalities for operation thereby.

As is shown in the drawing, the control is accomplished by means of a beam of light 71 reflected by a mirror 72 attached to the deflectable member and reflected by means of a synchronous vibrating unit 73, including a mirror 74 onto a photosensitive cell 75 which is in circuit with the grids of the thermionic devices.

In the illustrated embodiment of the invention, a fixed light source is utilized which is preferably in the form of an incandescent bulb 76 mounted in a casing 77 and connected through wires 76a, 76b to the supply wires. It is to be understood, however, that if required the light source can be made to move with the deflectable member.

The source of light has a lens 78 associated therewith for directing a beam of light against the mirror attached to the deflectable member. The deflectable member is pivotally mounted in a support 79 and has an operating portion 80 projecting therefrom to which suitable connection can be made.

If desired, suitable stops 81, 82 can be provided to limit the operation of the deflectable member to insure that the light beam controlled thereby will not be moved beyond the desired range necessary for illuminating the cell.

The light and the mirror are so disposed that the beam of light reflected by the mirror is directed to the vibrating unit 73 comprising a permanent magnet 84 having a moving coil 85 carried by a core 86 mounted on pivots 87 disposed between the poles thereof, which coil is connected to the supply wires 35. The moving coil 83 carries the small mirror 74 on the face of the core 86. The vibrating unit 73 is so disposed that the beam of light reflected by the mirror 72 of the deflectable member 70 will be directed by the mirror 74 toward the photosensitive cell 75. Preferably, the cell is of the emission type. The moving coil 85, which is connected to the supply wires 35, will oscillate in step with the alternating current wave, and, in so doing, will cause the mirror carried thereby to vibrate the light beam and form a ribbon or band, as indicated by the double dot-and-dash lines in Figure 1.

The photosensitive cell 75 is housed or screened by a casing 88 provided with two substantially small spaced apertures 89 and 90 having a barrier 88a therebetween. The apertures are so disposed as to occupy the positions corresponding to the positive and negative cycle of the alternating current wave. It will thus be seen that, if either of the apertures are illuminated by the oscillating beam, the photosensitive cell will be energized in timed relation with either the positive or negative half cycle of the wave.

The source of D. C. energy referred to above, in the illustrated form of the invention, comprises a bleeder resistance 92 connected across a conventional full wave rectifier 93 which is energized from the lines by means of a transformer 94.

A thermionic device 95, in the present preferred form of the invention, comprises a No. 57 tube, and a thermionic device 96, according to the present preferred form of the invention comprises a No. 27 tube, are connected across the bleeder resistance 92 so as to receive their proper potentials therefrom and thus provide suitable control for the grids of the tubes 50, 51. These tubes have their heater filaments 97, 98 energized from the transformer 94.

One terminal of the photosensitive cell is connected to the bleeder resistance through a wire 99, while the other terminal of the cell is connected by a wire 100 to the grid 101 of the thermionic device 95.

By so connecting the photosensitive cell through the devices 95 and 96, there will be imposed on the grid circuits of the thermionic devices 50, 51, upon light striking said cell, a charge which will be less negative than the cut-off potential and which will render the devices conductive to supply current to the control field.

From the academic viewpoint, a steady light, in striking the photosensitive cell 75, will so affect the grids that the thermionic devices 50 and 51 will function whenever their plates are positively charged, and since these latter are in phase opposition, one device will begin to function as soon as the other device has stopped functioning, the devices alternately functioning in step with the alterations of the plate charges.

However, to effect directional control of the motor, the beam of light extending from the deflectable member to the photosensitive cell is oscillated by means of the synchronized vibrating device 73 in such a manner that light will strike the cell at properly timed intervals so as to cause to function only one of the thermionic devices. The particular device which will be caused to function, being according to the direction of deflection of the deflectable member, and for zero deflection of the deflectable member, the light, as explained, will engage the barrier 88a and be completely cut off from the cell. Thus, if the deflectable member is deflected to the left, light will strike the photosensitive cell only at those times during which a positively charged plate exists in that thermionic device, which, when functioning, loads the coils of the motor with a current to produce an out-of-phase field so that the motor will rotate and drive the gears 41, 43 in the direction required to correct for the change in condition. It follows, therefore, that a right deflection of the deflectable member would, as a consequence, make the photosensitive cell operate the other thermionic device which causes the motor to rotate the gears 41, 43 in a direction to correct for the change of condition and lessen the right deflection of the deflectable member. Thus, there is effected a return to normal of the condition being controlled and it is to be noted that frequency of oscillation of the light beam is sufficiently high so that the movement of the motor in correcting the condition is not a step-by-step movement, but is of a substantially continuous nature.

The apertures 89 and 90 are so disposed with respect to the shield 88 that the aperture 89 will permit light from the deflectable member, when deflected to the left, to strike the photosensitive cell 75 only during those periods when the plate of one of the thermionic devices is positive, and, therefore, when that device is in condition to function so as to cause rotation of the motor 30 and that thermionic device is chosen which will cause the gears to move in a direction which will reduce the left deflection of the deflectable member. Therefore, the aperture 90 of the shield 88 will permit light from the deflectable member, when deflected to the right, to strike the photosensitive cell only during those periods when the other of the thermionic devices is in a condition to function by virtue of its plate being positive and to cause a movement of the gears such that the right deflection of the deflectable member will be lessened. Of course, when a normal condition exists, the deflectable member will be in zero position and light reflected from the mirror attached thereto will be prevented from striking the photosensitive cell because of the obstruction offered to it by barrier 88a formed by the imperforate portion of the shield intermediate the apertures 89 and 90.

As soon as a change in condition exists, the deflectable member will be operated and cause the beam to move into one or the other of the apertures to illuminate the cell.

As the light beam starts across the aperture, say for a change in the nature of one part in 400, the charge imposed on the grid, due to the partial illumination of the photo sensitive cell, will be sufficient to cause a slight voltage change on the grid and thereupon cause the tube to permit a small current in the control field which will result in the motor creeping in a direction to restore the condition to normal.

If the deflection is more than that produced by a change of one part in 400 so that the beam will be deflected and the aperture illuminated for a substantial extent, the motor will run at full speed.

In use, it is necessary that the control of the device actuated by the correcting motor be quick and accurate. This has been difficult to obtain in high speed operation due to the fact that the inertia of the moving parts of the correcting motor and the nature of its control prevents quick stopping from being achieved without a certain amount of overthrow.

According to the present invention, means are provided for bringing the motor to a stop and in effect anticipating the approach to the normal condition. This is accomplished by providing a movable barrier 105 extending over the outer face of the shield. The movable carrier has a normal position in which it overlies and coincides with the fixed barrier 88a on the shield.

While the movable barrier may be operated in many ways, in the preferred form of the invention it is connected to a movable coil 106 of a dynamometer type instrument 107 for movement thereby. The fixed coils 108 of the instrument are connected across the A. C. supply lines 35 and the movable coil is connected to the wires 46, 49. With the movable coil thus connected in the control coil circuit, it will be seen that when the circuit is supplied with out-of-phase current for operating the motor and effecting a balance by rotation in one direction or the other, the movable coil will also be energized by the same out-of-phase current and will react with the fixed coils to cause the movable barrier 105 to move in either direction, according to the amount and phase relationship of the current supplied to the control field and cover the aperture which is being illuminated by the oscillating beam.

For every small changes in the condition being measured, which would supply but a small current to cause the motor to creep, the deflection of the movable barrier would be minute. However, for large changes in condition, producing a substantial deflection of the beam which would bring the motor up to speed, the movable barrier will be moved to cover a substantial portion of the opening. The barrier, however, will not move far enough to cut off sufficient light from the aperture to cause the motor to operate at a speed less than full speed for full deflections of the deflectable member.

As a return to normal of a condition is approached, the deflectable member will gradually move the light back toward the barrier 88a to diminish the illumination of the photo sensitive cell and decrease the charge impressed on the grid causing the energization of the motor to be diminished so that it gradually slows down. When this occurs, energization of the movable coil 106 will be decreased and the barrier 105 will slowly move back toward the fixed barrier 88a of the shield.

It will be seen then that, by moving the barrier 105 into the zone of the aperture, I have, in effect, moved the edge of the fixed barrier to meet the light beam as it returns. As the motor speed decreases, due to the decreasing illumination of the cell, caused by the movement of the light beam to neutral position, the movable barrier will so slowly move back and will, in effect, stop the motor just at the time that the condition is restored to normal so that overrunning of the motor will be effectively prevented.

Should the motor for some reason overrun slightly, then the barrier will be in position to cover the opposite aperture, and, in effect, dampen any tendency of the light beam to cause reverse rotation of the motor.

It will be seen, therefore, that the motor will quickly and accurately be brought to a stop without any overthrow upon the balanced condition being attained.

Variations and modifications may be made within the scope of this invention and portions of the improvements may be used without others.

I claim:

1. In a control system, a control shaft; an A. C. motor for rotating said shaft; means including a circuit for energizing and controlling said motor including a single light beam and a photosensitive cell; and means actuated in response to the current flow in said circuit for regulating the illumination of the photosensitive cell to control the operation of said motor.

2. In a control system, a control shaft adapted to be associated with work-producing means; means for operating the control shaft comprising a reversible A. C. motor; an energizing circuit for said motor; means in said circuit for controlling the direction and amount of rotation of said motor including a photosensitive cell and a single light beam movable from zero position to illuminate said cell; and means including a movable barrier actuated in response to changes of condition in the energizing circuit for the motor for controlling the illumination of the cell to quickly bring the motor to a stop without overthrow.

3. In a control system, a control shaft adapted to be associated with work-producing means; means for operating the control shaft comprising a reversible A. C. motor; means for supplying energy to and controlling the direction and amount of rotation of said motor including a photosensitive cell and a single light beam movable from zero position to illuminate said cell; and means including a movable barrier and an operator therefor connected to said motor and energized in response to the energy input of the motor for moving the barrier in the direction to control the illumination of the cell to quickly bring the motor to a stop without overthrow.

4. In a control system, and A. C. motor having a continuously energized A. C. field and a separately excited control field; an actuator having a normal zero position and being movable to either side of the zero position in accordance with the change of a condition from normal; thermionic devices for controlling the energization of the control field; and means including a photosensitive cell and a single light beam constituting the sole means for illuminating said cell in accordance with the movement of the actuator to either side of the zero position for selectively controlling the thermionic devices to supply a proper out-of-phase current to said control field to rotate said motor in the desired direction to correct for said change in condition.

5. In a control system, a reversible A. C. motor having a continuously energized A. C. field and a separately excited control field; a deflectable member having a normal zero position and being movable to either side of the zero position in accordance with the change of a condition from normal; normally inoperative thermionic devices for controlling the energization of the control field; and means including photoelectric means and a single light beam constituting the sole means for illuminating said photoelectric means in predetermined timed relation with the energization of said motor and thermionic devices in accordance with the movement of the deflectable member to either side of the zero position to reduce the negative potential on the grids of the thermionic devices to render the devices operative to supply a proper out-of-phase current to said control field to set up a rotating field to rotate said motor in the desired direction to correct for a change in condition.

6. In a control system, an A. C. motor having a continuously energized A. C. field and a separately excited control field comprising a plurality of coils connected in opposition so that the induced voltage therein is zero; a deflectable member having a normal zero position and being movable to either side of the zero position in accordance with the change of a condition from normal; thermionic divices for controlling the energization of the control field; and means including a photoelectric cell and a light beam for illuminating said cell in accordance with the position of the deflectable member for controlling the thermionic devices to cause the energizing means to supply out-of-phase current to said control field to rotate said motor in the disired direction to correct for a change in condition.

7. In a control system, a control shaft; a reversible A. C. motor for rotating said shaft having a main field and a control field; means for controlling said motor including a photosensitive cell and a single light beam operated in accordance with a change in a condition; a movable barrier for regulating the illumination of said photosensitive cell by said light beam; means for moving said barrier comprising a fixed coil energized in timed relation with the main motor field; and a movable coil carrying the barrier and connected in the control field whereby the barrier will be moved in accordance with the energization of said motor to drive the same to control the illumination of said cell so as to anticipate a return to normal condition.

8. In a control system, a control shaft; means for adjusting the control shaft comprising a reversible A. C. motor having a continuously energized A. C. field and a control field; means for controlling the energization of the control field including a light-sensitive cell and a source producing a beam of light; a deflectable member for directing said beam in either of opposite directions from a neutral position in response to a change in a condition; means including a shield for the light-sensitive cell having spaced apertures therein; means for periodically oscillating the light beam to cause the beam to periodically illuminate one or the other of said apertures dependent upon the direction of movement of the deflectable member from neutral so that pulsating currents are set up and cause said controlling means to energize the control field in predetermined timed relation with the A. C. energization of the main field; and means disposed before the apertured shield and operable in response to the energization of the control field of the motor for regulating the opening of the aperture in the shield which is illuminated by the light beam in response to operation of the deflectable member to quickly bring the motor to a stop upon a normal condition being attained without overrunning of the motor.

9. In a control system, a control shaft adapted to be associated with a work-producing means; means for operating said control shaft comprising a reversible A. C. motor having a rotor, a main field continuously energized by alternating current, and a control field comprising a plurality of wound coils mounted thereon so as to be mechanically displaced from the main field with the coils connected in series in opposition so that the induced voltage in the circuit will be zero; a deflectable member having a normal zero position and being movable to either side of the zero position in accordance with the change of a condition from normal; thermionic devices for controlling the energization of the control field from a source independent of said main field; and means including photoelectric means and a light beam for illuminating said cell in accordance with the position of the deflectable member for controlling the thermionic devices to cause the energizing means for the control field to supply out-of-phase current to cause said motor to rotate in the desired direction to drive said workshaft to correct for said change in condition.

10. In a control system, a control shaft; means for operating said control shaft comprising a reversible A. C. motor having a rotor, a pole piece surrounding said rotor to form a closed magnetic path therearound, a coil mounted on the pole piece and continuously energized by alternating current to produce a main field, and a control field comprising a plurality of wound coils mounted on the pole piece mechanically displaced from the main field with the coils connected in series in opposition so that the induced voltage in the circuit will be zero; an actuator having a normal zero position and being movable to either side of the zero position in accordance with the change of a condition from normal; normally inoperative thermionic devices for controlling the energization of the control field; and means including photosensitive cell means and a light beam for illuminating said cell in accordance with the position of the actuator for rendering the thermionic devices operative to cause the energizing means to supply out-of-phase current to said control field dependent upon the extent of illumination of said cell to rotate said motor in the desired direction to drive said control shaft.

11. In a control system, a control shaft adapted to be associated with a work-producing means; means for operating said control shaft comprising a reversible A. C. motor having a rotor, a pole piece surrounding said rotor to form a closed magnetic path therearound, said pole piece having two pairs of oppositely disposed slots, a coil mounted on the pole piece and continuously energized by alternating current to produce a main field, and a control field comprising a plurality of wound coils mounted in the slots and connected in pairs to produce north and south poles mechanically displaced from the main field with the pairs of coils connected in opposition so that the induced voltage in the circuit will be zero; an actuator having a normal zero position and being movable to either side of the zero position in accordance with the change of a condition from normal; thermionic devices for controlling the energization of the control field; and means including photosensitive cell means and a light beam for illuminating said cell in accordance with the position of the actuator for controlling the thermionic devices to cause the energizing means to supply out-of-phase current to said control field to rotate said motor in the desired direction to correct for a change in condition.

12. In a control system, an A. C. motor having a continuously energized A. C. field and a separately excited control field; an actuator having a normal zero position and being movable to either side of the zero position in accordance with the change of a condition from normal; thermionic devices for controlling the energization of the control field; means including a photosensitive cell and a light beam for illuminating said cell in accordance with the position of the acutator for controlling the thermionic devices to cause the energizing means to supply out-of-phase current to said control field to rotate said motor in the desired direction to correct for a change in condition; and means actuated in response to the out-of-phase current supplied to the control field of said motor for regulating the illumination of said cell to quickly bring the motor to rest as the normal condition is attained.

13. In a control system, a control shaft; an alternating current motor for driving said shaft having a main continuously energized A. C. field and a control field; a means including thermionic devices connecting the control field to a source to be energized independently of said main field; a deflectable member having a normal zero position; means operated in accordance with off-zero movement of the deflectable member to control the thermionic devices and regulate the time and quantity of energizing current supplied to said control field, said means causing the current to be out of phase with the energization of the main field to rotate the motor in the desired direction; and means actuated in response to the current supplied to the control field for regulating the operation of said thermionic devices so as to quickly stop said motor without overrunning of the same.

MANFRED J. JOHNSON.

CERTIFICATE OF CORRECTION.

Patent No. 2,307,134. January 5, 1943.

MANFRED J. JOHNSON.

It is hereby certified that error appears in the printed specification of the above numbered patent requiring correction as follows: Page 2, second column, line 27, for "ane" read --one--; page 4, first column, line 2, for "alterations" read --alternations--; and second column, line 21, for "carrier" read --barrier--; line 44, for "every" read --very--; page 5, first column, line 53, claim 4, for "and" read --an--; second column, line 23, claim 6, for "divices" read --devices--; line 30, for "disired" read --desired--; and that the said Letters Patent should be read with this correction therein that the same may conform to the record of the case in the Patent Office.

Signed and sealed this 2nd day of March, A. D. 1943.

(Seal)

Henry Van Arsdale,
Acting Commissioner of Patents.